US009925447B2

(12) United States Patent
Hajnasr

(10) Patent No.: US 9,925,447 B2
(45) Date of Patent: Mar. 27, 2018

(54) PORTABLE, ADJUSTABLE SUPPORT STRUCTURE FOR A SPEED BAG

(71) Applicant: George Hajnasr, Kingston, MA (US)

(72) Inventor: George Hajnasr, Kingston, MA (US)

( * ) Notice: Subject to any disclaimer, the term of this patent is extended or adjusted under 35 U.S.C. 154(b) by 15 days.

(21) Appl. No.: 15/215,543

(22) Filed: Jul. 20, 2016

(65) Prior Publication Data
US 2017/0100657 A1 Apr. 13, 2017

Related U.S. Application Data

(60) Provisional application No. 62/195,070, filed on Jul. 21, 2015.

(51) Int. Cl.
  *A63B 69/20* (2006.01)
  *A63B 71/02* (2006.01)
  *F16B 7/10* (2006.01)

(52) U.S. Cl.
  CPC .......... *A63B 69/205* (2013.01); *A63B 69/206* (2013.01); *A63B 2071/025* (2013.01); *A63B 2210/50* (2013.01); *A63B 2210/58* (2013.01); *A63B 2225/093* (2013.01); *F16B 7/105* (2013.01)

(58) Field of Classification Search
  CPC ..... A63B 69/20; A63B 69/201; A63B 69/203; A63B 69/205; A63B 69/206; A63B 69/208; A63B 69/24; A63B 69/26; A63B 69/32; A63B 69/325; A63B 69/34; A63B 69/345; A63B 71/02; A63B 71/023; A63B 71/04; A63B 2071/025; A63B 2210/00; A63B 2210/50; A63B 2210/58; A63B 2225/09; A63B 2225/093; A63B 2225/10; A63B 2225/105; A63B 2225/107; A63B 2244/10; A63B 2244/102; A63B 2244/104; A63B 2244/106; A63B 2244/108
  USPC ...................................... 482/83–90
  See application file for complete search history.

(56) References Cited

U.S. PATENT DOCUMENTS

| | | | | | |
|---|---|---|---|---|---|
| 2,227,310 | A | * | 12/1940 | Hoppes | A63B 63/083 248/129 |
| 2,625,356 | A | * | 1/1953 | Kennedy | A63B 69/205 248/121 |
| 3,411,497 | A | * | 11/1968 | Rickey | A61H 1/005 482/138 |
| 3,510,131 | A | * | 5/1970 | Gardner | A63B 69/205 248/161 |

(Continued)

*Primary Examiner* — Andrew S Lo
*Assistant Examiner* — Gary D Urbiel Goldner
(74) *Attorney, Agent, or Firm* — Barlow, Josephs & Holmes, Ltd.

(57) ABSTRACT

An adjustable support for a speed bag includes a base and a telescoping support column. The column is pivotably connected to the base and movable between a folded position and a deployed upright position. The support further includes a cantilever arm having a first end pivotably connected to an upper column portion of the column, and a speed bag platform is secured adjacent a second end of the cantilever arm. The cantilever arm is movable between a first folded position and a second cantilever position. A platform locking mechanism releasably secures the cantilever arm in the second cantilever position, whereby the pivoting and telescoping column and the pivoting cantilever arm and speed bag platform allow the speed bag to be deployed and used at a plurality of heights and orientations.

15 Claims, 6 Drawing Sheets

(56) References Cited

U.S. PATENT DOCUMENTS

| | | | | |
|---|---|---|---|---|
| 4,482,150 A * | 11/1984 | Levine | A63B 69/201 | 482/90 |
| 4,557,478 A * | 12/1985 | Levine | A63B 69/201 | 482/89 |
| 5,050,866 A * | 9/1991 | Fucci | A63B 69/205 | 473/483 |
| 5,098,092 A * | 3/1992 | Aakre | A63B 63/083 | 473/483 |
| 5,248,140 A * | 9/1993 | Mower | A63B 63/083 | 206/315.1 |
| 5,259,612 A * | 11/1993 | Matherne | A63B 71/023 | 220/375 |
| 5,354,049 A * | 10/1994 | Matherne | A63B 63/083 | 206/315.1 |
| 5,390,914 A * | 2/1995 | Schroeder | A63B 63/083 | 248/158 |
| 5,460,343 A * | 10/1995 | Hestilow | A63B 69/201 | 248/121 |
| 5,554,088 A * | 9/1996 | Zlojutro | A63B 69/004 | 482/83 |
| 5,730,668 A * | 3/1998 | Hege | A63B 71/023 | 206/315.9 |
| 5,823,898 A * | 10/1998 | Wang | A63B 71/023 | 473/483 |
| 5,863,278 A * | 1/1999 | Chen | A63B 69/20 | 482/83 |
| 5,881,537 A * | 3/1999 | Schickert | A63B 63/083 | 53/445 |
| 5,893,809 A * | 4/1999 | Coats | A63B 63/083 | 473/479 |
| 5,902,197 A * | 5/1999 | Davis | A63B 63/083 | 473/479 |
| 5,944,639 A * | 8/1999 | Ray | A63B 69/205 | 482/83 |
| 5,983,602 A * | 11/1999 | Allen | A63B 63/083 | 473/479 |
| D431,061 S * | 9/2000 | Solis | D21/719 | |
| 6,866,596 B2 * | 3/2005 | Steed | A63B 63/083 | 473/472 |
| 6,932,725 B2 * | 8/2005 | Monsen | A63B 63/083 | 248/280.11 |
| 7,691,015 B2 * | 4/2010 | Nye | A63B 63/083 | 473/479 |
| 7,981,009 B2 * | 7/2011 | Brenner | A63B 69/34 | 482/83 |
| D651,675 S * | 1/2012 | Norton | D21/787 | |
| 8,900,074 B1 * | 12/2014 | Johnson | A63B 69/205 | 473/422 |
| 9,272,198 B2 * | 3/2016 | Brenner | A63B 69/004 | |
| 9,707,463 B2 * | 7/2017 | Hudson | A63B 69/201 | |
| 2005/0164847 A1 * | 7/2005 | Giusti | A63B 69/20 | 482/86 |
| 2006/0183574 A1 * | 8/2006 | Stanford | A63B 63/083 | 473/481 |
| 2007/0026976 A1 * | 2/2007 | Nye | A63B 63/083 | 473/481 |
| 2007/0042843 A1 * | 2/2007 | Nye | A63B 63/083 | 473/481 |
| 2007/0238559 A1 * | 10/2007 | Nye | A63B 63/083 | 473/481 |
| 2008/0139367 A1 * | 6/2008 | Cooper | A63B 17/00 | 482/83 |
| 2008/0220949 A1 * | 9/2008 | Yang | A63B 71/023 | 482/90 |
| 2010/0323851 A1 * | 12/2010 | Hodges | A63B 69/201 | 482/89 |
| 2012/0309594 A1 * | 12/2012 | Hodges | A63B 69/201 | 482/87 |
| 2014/0243165 A1 * | 8/2014 | Hall | A63B 69/20 | 482/83 |
| 2014/0274610 A1 * | 9/2014 | Wilson | A63B 69/201 | 482/138 |
| 2014/0309082 A1 * | 10/2014 | Iglehart | A63B 69/32 | 482/9 |
| 2015/0011365 A1 * | 1/2015 | Nelson | A63B 69/205 | 482/84 |
| 2015/0011366 A1 * | 1/2015 | Hockridge | A63B 69/205 | 482/87 |
| 2015/0265898 A1 * | 9/2015 | Hall | A63B 69/34 | 482/83 |
| 2015/0290518 A1 * | 10/2015 | Hudson | A63B 69/201 | 482/90 |
| 2017/0021258 A1 * | 1/2017 | Hoggatt | A63B 69/201 | |
| 2017/0087435 A1 * | 3/2017 | Jones | A63B 69/206 | |

* cited by examiner

PORTABLE, ADJUSTABLE SUPPORT STRUCTURE FOR A SPEED BAG

CROSS-REFERENCE TO RELATED APPLICATION

This application claims the benefit of U.S. Provisional Patent Application No. 62/195,070, filed Jul. 21, 2015, the entire contents of which are incorporated herein by reference.

BACKGROUND OF THE INVENTION

The instant invention relates to a support structure for a speed bag, and more particularly to a portable and adjustable support structure.

Speed bag work is an important part of training for boxers, and those participating in martial arts of all kinds. Speed bag work is an excellent way to enhance fitness as well as speed and hand and eye coordination while getting a complete body workout. Many people wanting to participate in boxing or martial arts, or similar sports, or people who wish to enjoy a different form of exercise would like to learn to use a speed bag, but access to speed bag equipment is usually limited to those with gym or fitness center memberships where speed bags are installed. Thus, use of speed bags is unavailable to many.

One reason that access to speed bags is limited is that speed bag platforms are typically mounted to a ceiling or wall, are bulky and are permanently exposed. Homeowners, and those who rent, in most cases, do not want to mount a speed bag in their home because ceiling and/or wall damage can occur during installation and use. Also, a mounted speed bag is limited in the way it is used and can only be used easily by those of a certain height. It is impossible to adjust the height of a permanently mounted speed bag, restricting use by individuals of varying heights or anyone with a physical impediment or a person who is wheelchair bound.

SUMMARY OF THE INVENTION

The present invention provides a portable, adjustable support structure for a speed bag. The support structure is lightweight, adjustable, and virtually effortless to operate. The present invention thus provides an easy way for those without gym or fitness center memberships to work out with a speed bag.

In an exemplary embodiment of the present invention, the portable, adjustable support includes a base, and a telescoping column that has a lower column portion and an upper column portion, with the lower column portion being pivotably connected to the base adjacent a front side thereof. The upper column portion slides with respect to the lower column portion to provide a telescoping adjustment feature. The telescoping column further includes a rack and pinion actuator for easily extending the upper column portion and a locking mechanism for securing the column portions in a plurality of vertical positions. A cantilever arm is pivotably connected at one end thereof to the top end of the upper column portion and a speedbag platform is secured to the cantilever arm. The platform is configured for supporting a speed bag at the center thereof. The pivoting/telescoping column and the pivoting cantilever arm allow the platform and speed bag to be positioned at a range of heights and orientations.

The telescoping column is pivotably movable from a horizontal position parallel to the base (extending rearwardly) to a vertical position perpendicular to the base. The column can be locked in the vertical position with angled support arms which connect between the base and the lower column portion. When the telescoping column extends upwardly from the base, the speed bag platform can be arranged at a plurality of vertical heights.

The pivotable cantilever arm and platform are movable between a first position wherein the cantilever arm is parallel to the support column and the platform faces forwardly, and a second cantilever position wherein the cantilever arm is perpendicular to the telescoping support column. With the support column in the vertical position, and the cantilever arm and platform in their first, forward facing position, the speed bag can be raised or lowered to any desired height. With the support column in the vertical position, and the cantilever arm in the second cantilever position, the speed bag can also be raised or lowered to any desired height.

The support can also be used with the support column in the horizontal (folded) position and the cantilever arm and platform parallel to the column (horizontal and facing upwardly).

Accordingly, among the objects of the instant invention are: the provision of an adjustable support for a speed bag that provides a way for all consumers, including those with physical limitations, to train using a speed bag; the provision of an adjustable support that is portable, lightweight, and virtually effortless to use; the provision of an adjustable support that can be easily adjusted for both vertical and horizontal hitting; the provision of an adjustable support that can be easily adjusted for users having a height in the range of 4 feet to 7 feet, including the endpoints of the range; the provision of an adjustable support that is useful for helping wheelchair-bound individuals build speed and hand-eye coordination, while getting a good upper body workout; the provision of an adjustable support that eliminates wall damage caused by being impacted by the speed bag or caused by hardware used for mounting a speed bag to a wall; and the provision of an adjustable support that can be easily stored and removed from sight when not in use.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated of carrying out the present invention.

DESCRIPTION OF THE PREFERRED EMBODIMENT

Figure 1:
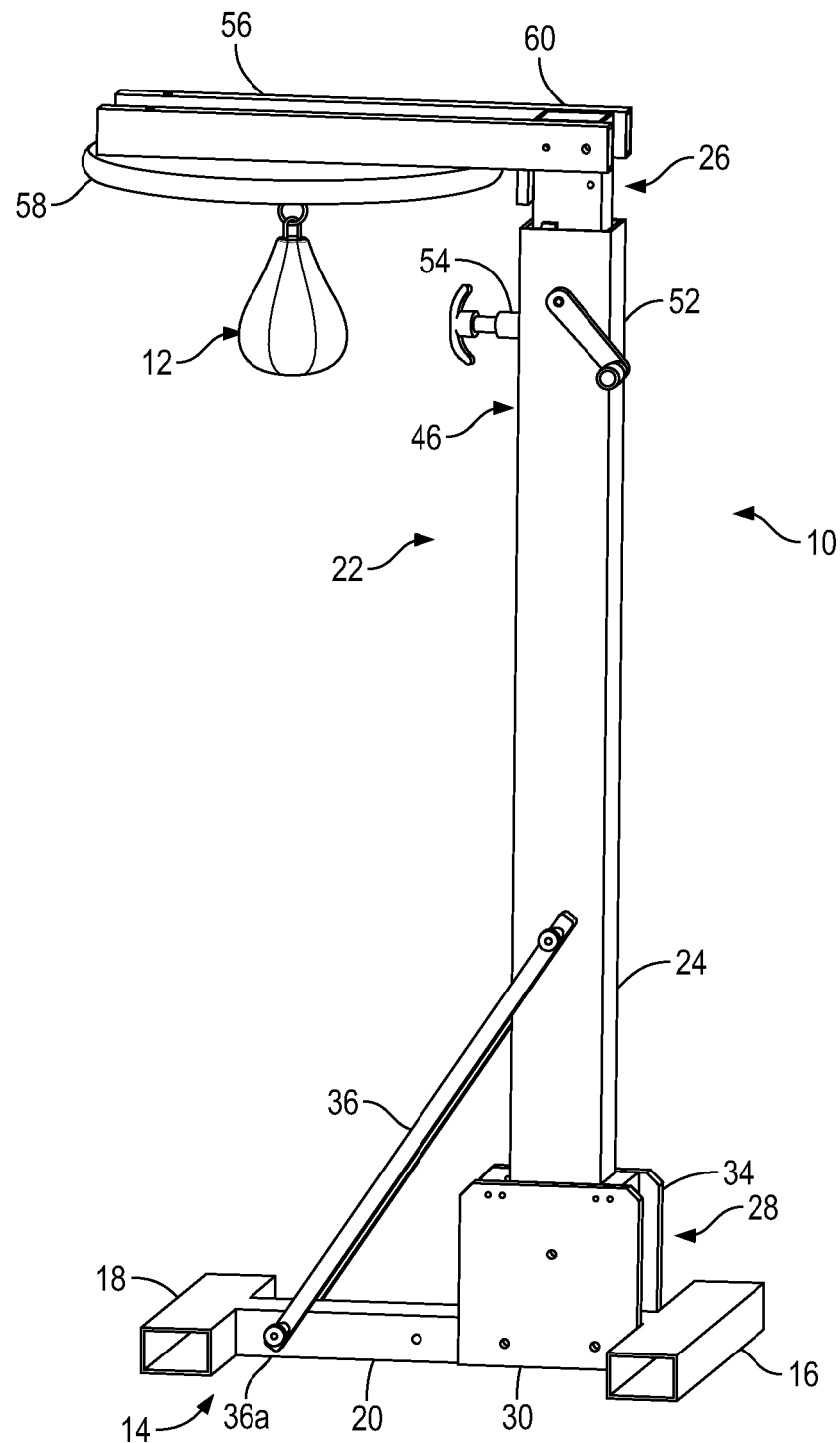
FIG. 1 is a perspective view of an exemplary embodiment of the adjustable support of the present invention deployed in a first.

Referring now to the drawings, the adjustable speed bag support of the instant invention is illustrated and generally indicated at 10 in FIGS. 1-6. As will hereinafter be more fully described, the instant invention provides a portable adjustable support 10 for a speed bag 12 that can stand alone and does not need to be mounted on a wall. The adjustable support 10 is lightweight, adjustable, and virtually effortless to operate.

The adjustable support 10 is extremely versatile because it is freestanding unit that can be moved and adjusted according to the needs of the user. The adjustable support 10 can be transported to and deployed for use wherever a person trains.

Generally, the adjustable support 10 can be configured for both horizontal and vertical deployment of the speed bag 12 by utilizing a pivoting speed bag platform. A telescoping support column is adjustable in height as well, allowing the same speed bag 12 to be used by persons of differing heights, including those seated in wheelchairs. The support column is connected to a base with a pivoting hinge assembly that allows the column to be supported vertically or to be folded flat, in line with the base so the unit can be stored easily. In the flat, or folded, configuration, the adjustable support assembly 10 can be slid under a bed or a couch, or set in a closet or other place where it is out of the way.

As will be described hereinbelow, an exemplary embodiment of the adjustable support 10 is illustrated in FIGS. 1-6. The adjustable support 10 has a base 14 that is configured to be supported on a floor, or other generally horizontal support surface. The base 14 is generally formed in the shaped of a capital letter I with a front leg 16, a rear leg 18 and a center leg 20 connecting the front 16 and rear 18. The shape of the base 14 is not particularly critical as long as it provides a stable support, and the scope of the invention should not be limited by the illustrated embodiment.

The adjustable support 10 further includes a telescoping support column 22 having a lower column portion 24 and an upper column portion 26. The lower column portion 24 is pivotably connected to the base 14 adjacent to the front leg 16 within a hinge mechanism 28 secured to the center leg 20 of the base 14. The hinge 28 includes opposing plates 30, 32 and the lower column portion 24 is pivotably movable on a hinge pin 34 extending between the plates 30, 32 and through the lower column portion 24. In operation, the telescoping column 22 is pivotably movable between a folded position (FIG. 6), wherein the telescoping support column 22 is substantially parallel to the base 14, and a deployed upright position (FIGS. 1-5) wherein the telescoping support column 22 is substantially perpendicular to the base 14. The lower column portion 24 and hinge plates 30,32 are configured to slidably lock into place when rotated to the respective folded or deployed positions. To further support the column 22 in the upright vertical position, the assembly 10 is provided with angled support arms 36, 38 which extend between the lower column portion 24 and the center leg 20 of the base 14. More specifically, one end of each support arm 36, 38 is pivotably secured to the lower column portion 24 where it can rotate into the desired folded or locked position. The opposing end is provided with threaded posts 36A, 38A which are selectively received into corresponding threaded openings (See 44 in FIG. 6—only one shown) on the side surfaces of the center leg 20.

Figure 3:
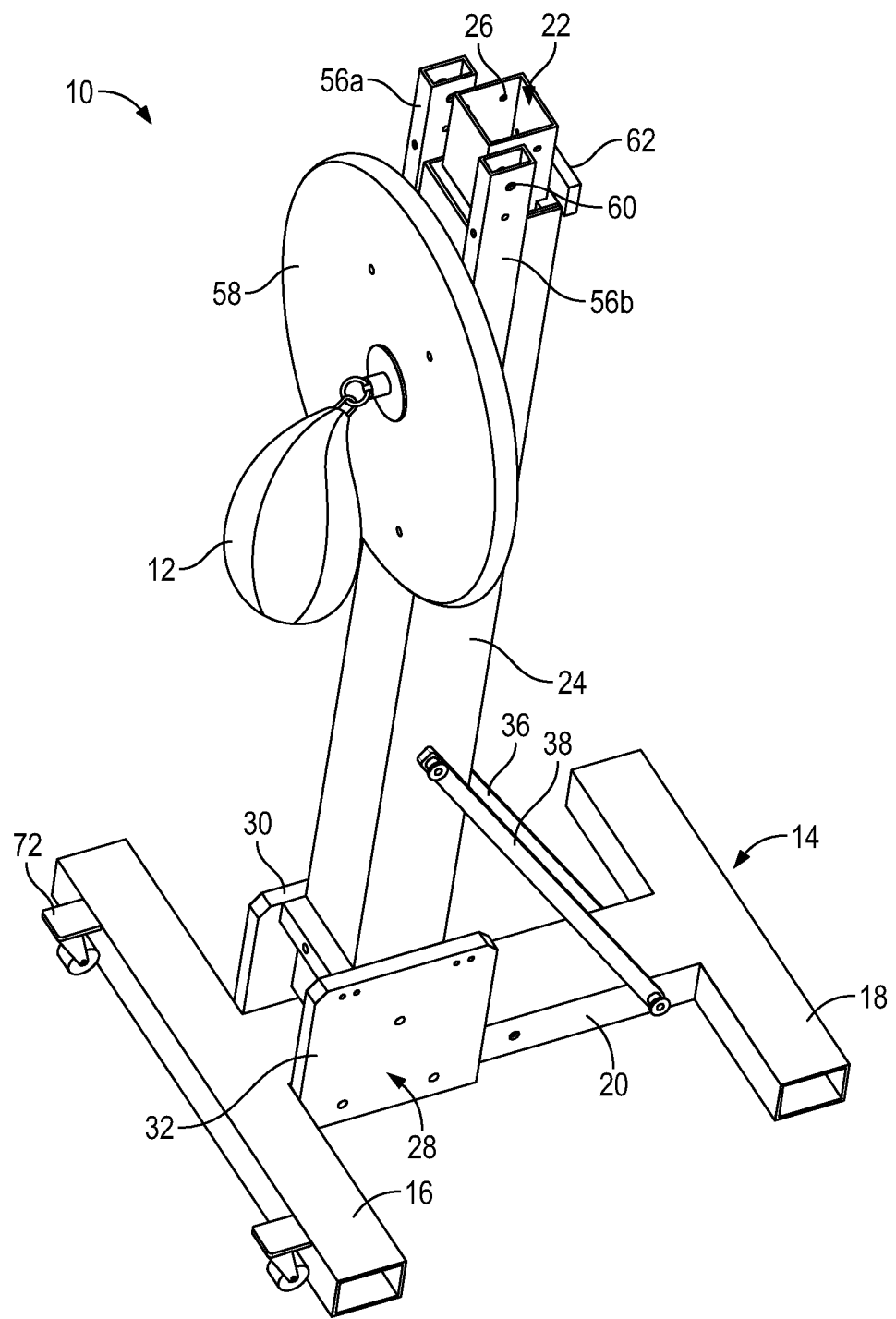
FIG. 3 is yet another perspective view thereof deployed in a third configuration.
Figure 4:
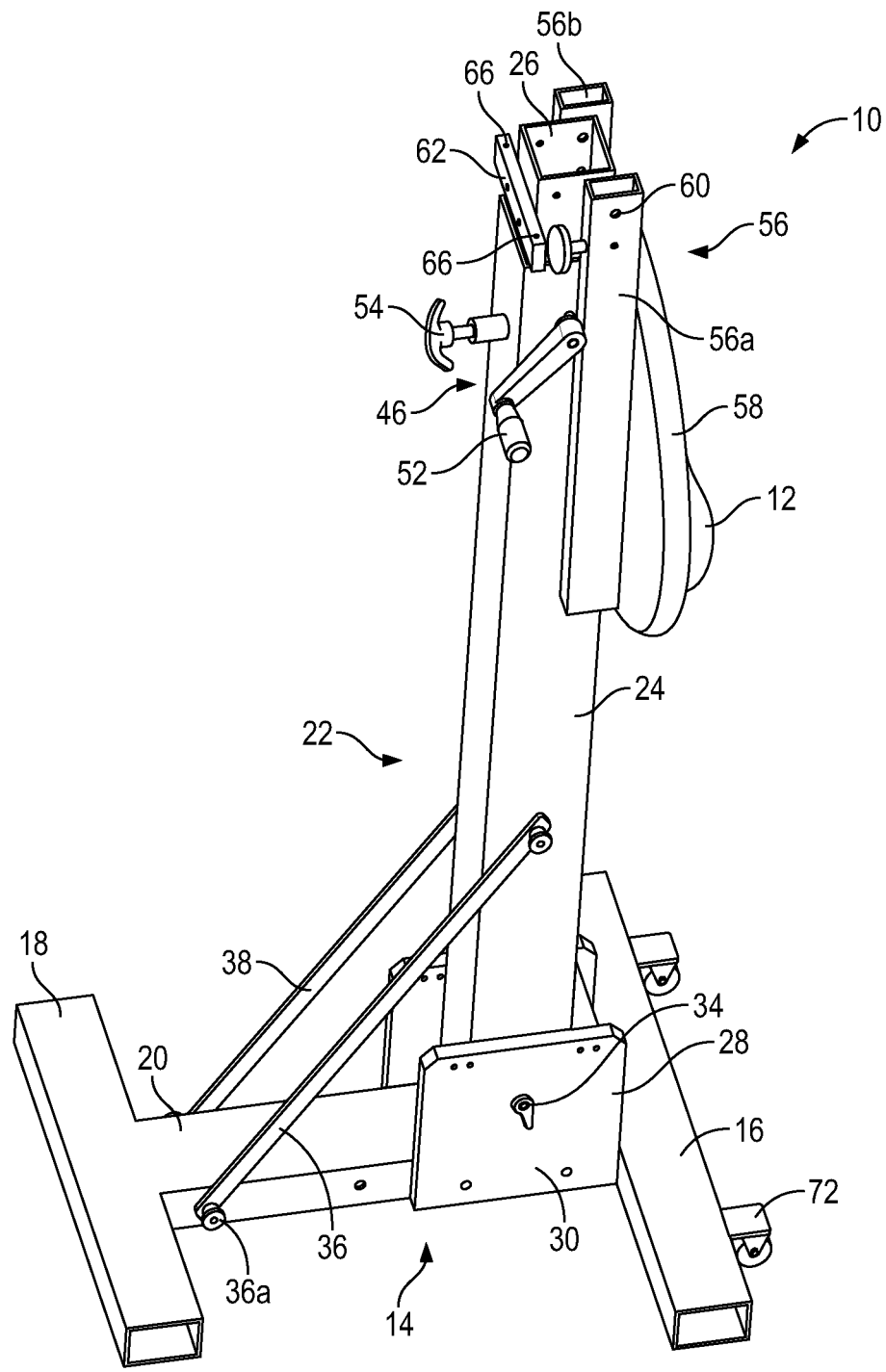
FIG. 4 is another view thereof.
Figure 5:
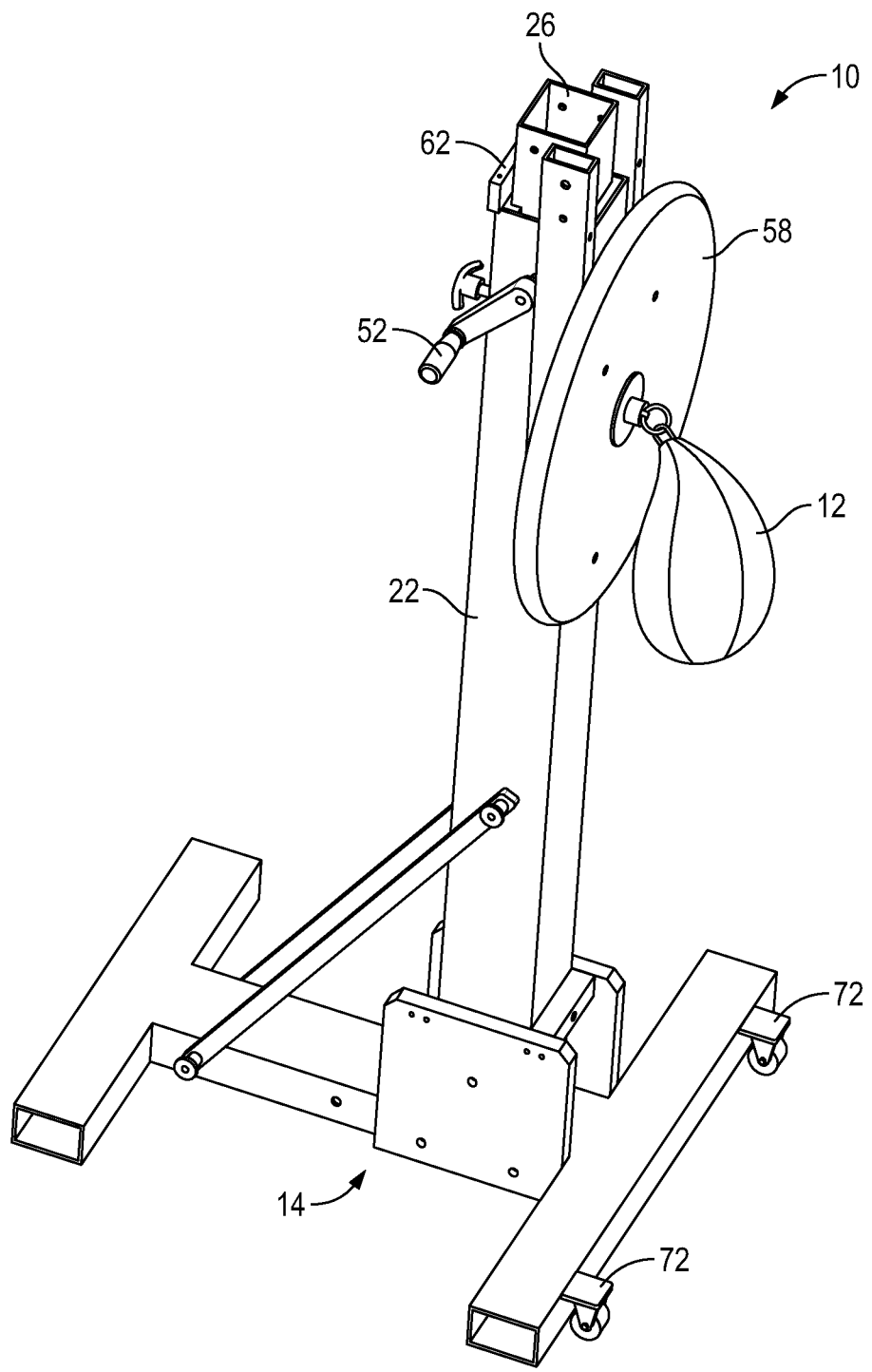
FIG. 5 is still another view thereof.

The upper column portion 26 is slidably received within the lower column portion 24 so that the upper and lower column portions 26, 24 are telescoping. A rack and pinion actuator mechanism generally indicated at 46 moves the upper column portion 26 relative to the lower column portion 24 between a retracted position (FIGS. 1 and 3-6) and an extended position (FIG. 2). The rack gear 48 extends longitudinally along the upper column portion 26 (See FIG. 2) and the pinion gear (not shown) of the actuator 46 is driven by a handle 52 as seen in FIGS. 2, 4 and 5. Other types of actuator mechanisms are contemplated within the scope of the invention and the invention should not be limited by the illustrated embodiment. Further, it is contemplated that support 10 may be provided without an actuator and that the upper column portion 26 is moved manually.

A telescoping locking mechanism, comprising a spring biased locking pin 54 (see FIG. 4), is configured to releasably lock the upper column portion 26 in a plurality of telescoping positions relative to the lower column portion 24.

The support 10 further includes a cantilever arm generally indicated at 56 having a first end pivotably connected to a top end of said upper column portion 26, and a speed bag platform 58 secured adjacent an opposing second end of the cantilever arm 56. The cantilever arm 56 comprises spaced arm portions 56A, 56B which are received on opposing sides of the upper column portion 26 and pivotably connected with a pivot pin 60 that extends through both arms 56A, 56B and through the upper column portion 26. The speed bag platform 58 is generally circular in shape as known in the art and is secured to the arms 56A, 56B adjacent the second end thereof. Likewise, the speedbag 12 is mounted in the center of the platform 58 as known in the art.

The cantilever arm 56 and speed bag platform 58 are movable between a first folded position (FIGS. 3-6), wherein the cantilever arm 56 and speed bag platform 58 are substantially parallel to the telescoping support column 22 (platform facing forward) and a second cantilever position (FIGS. 1 and 2) wherein the cantilever arm 56 and speed bag platform 58 extends substantially perpendicular to the telescoping support column 22 (extending rearwardly—arm 56 and platform 58 flipped up and over towards the rear). To support the cantilever arm 56 in the extended cantilever position, a cross-beam 62 is secured to the rear side of the upper column portion 26. The cantilever arm 56 rests on top of cross beam 62 in the extended position. Platform locking mechanisms 64 are configured and arranged to releasably secure the cantilever arm 56 in at least the second cantilever position. Referring to FIGS. 2 and 4, it can be seen that each of the cantilever arms 56A, 56B is provided with a threaded post 64A, 64B which extends through the respective arms 56A, 56B and is receivable in corresponding threaded holes 66A, 66B in the top of the cross beam 62.

It can thus be seen that the telescoping lower and upper column portions 24, 26 and the pivoting cantilever arm 56 and speed bag platform 58 allow a speed bag 12 to be deployed and used at a plurality of heights and orientations. Whether the platform 58 is oriented so the platform surface is horizontal or so the platform surface is vertical, a speed bag 12 can be connected to the platform surface at an attachment point. This allows a user to engage in different exercise activities with the speed bag 12, depending on the orientation of the platform 58.

Figure 2:
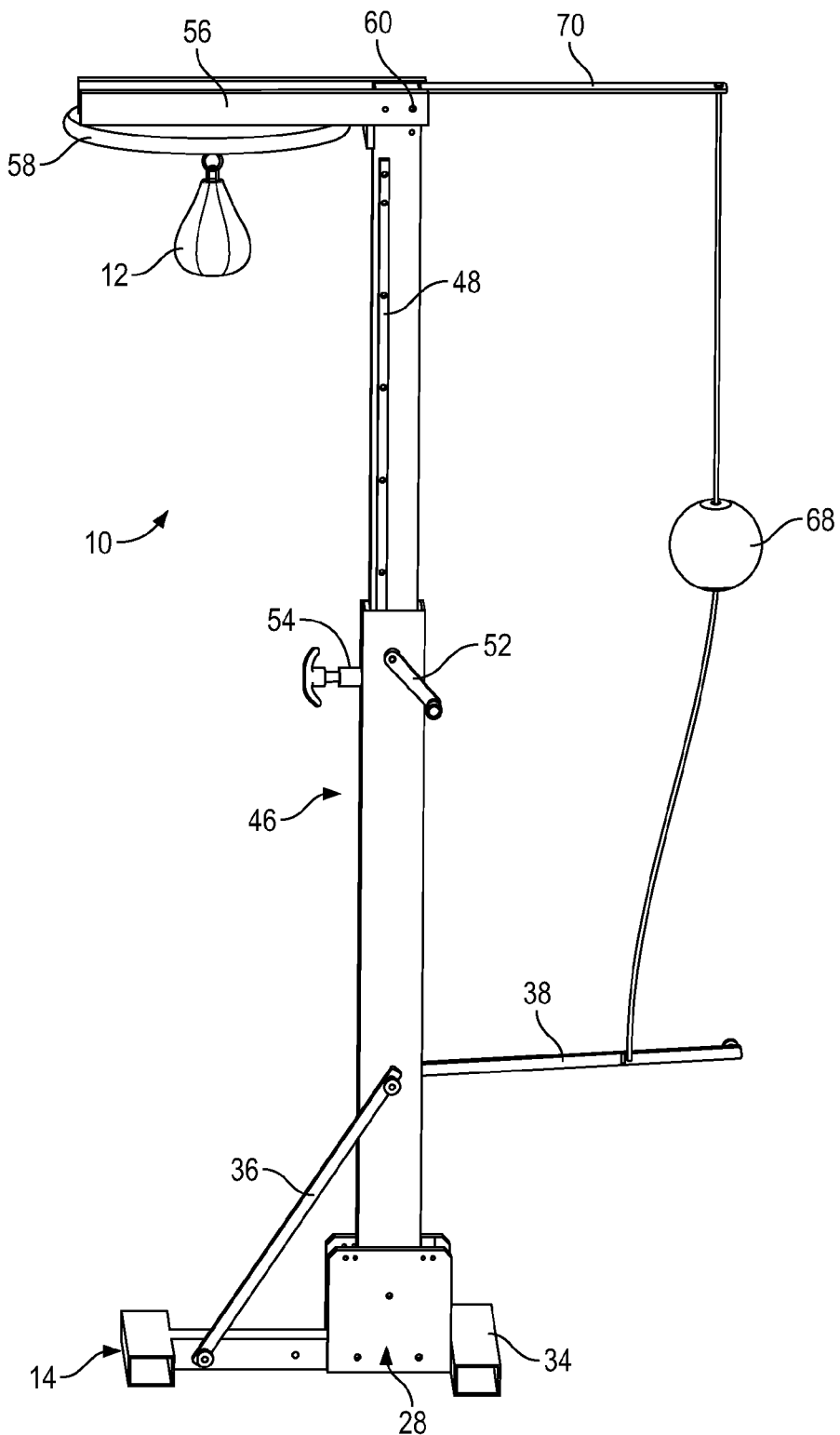
FIG. 2 is another perspective view thereof deployed in another configuration.
Figure 6:
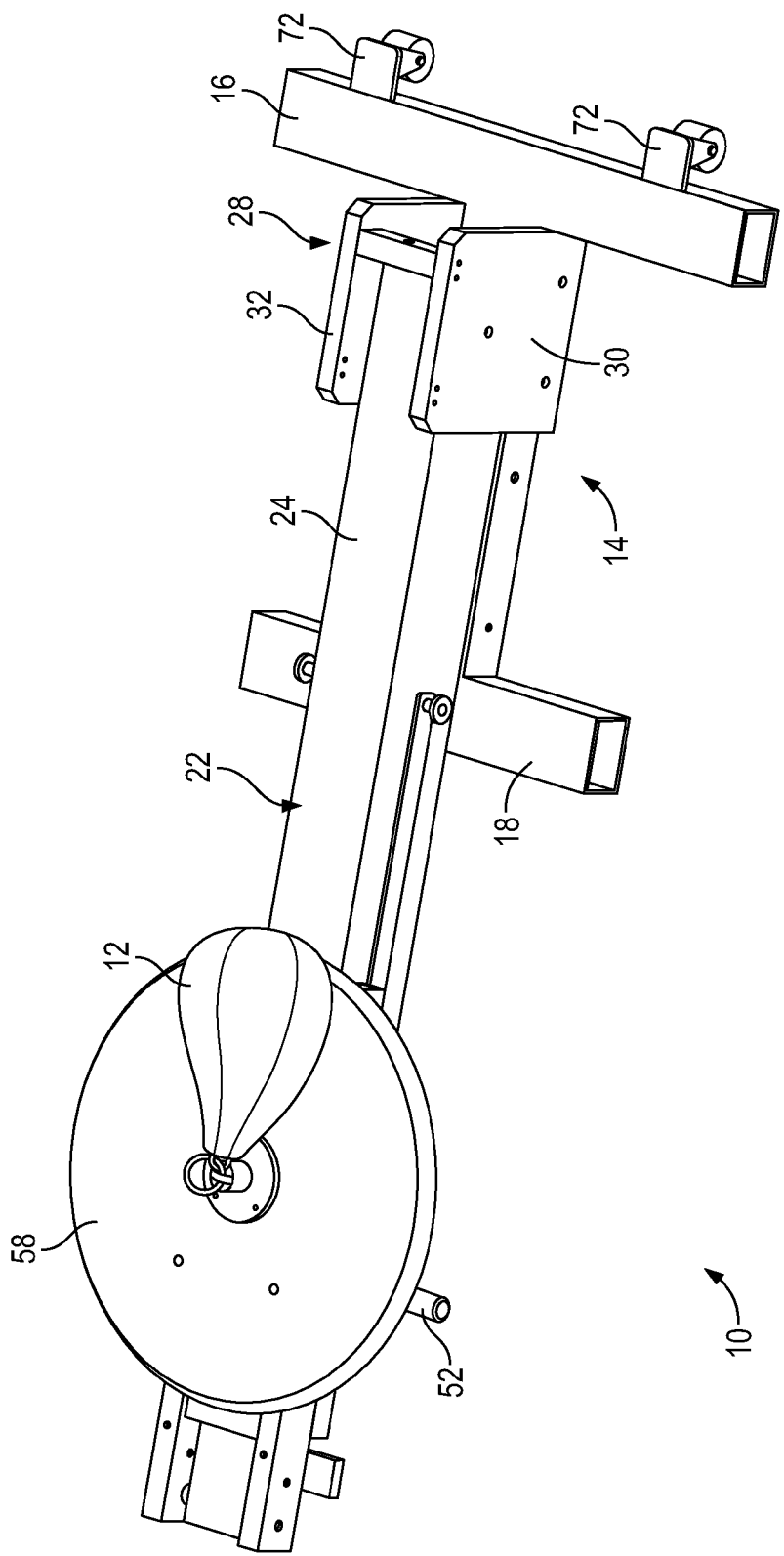
FIG. 6 is a top perspective view of the exemplary embodiment folded to a storage/floor use configuration.

In FIG. 1, the support column 22 is deployed to its vertical position and the cantilever arm 56 is extended horizontally so that the speed bag 12 hangs downwardly in a traditional presentation. The upper column portion 26 remains at its lowest retracted position to accommodate smaller users or users that may be wheelchair bound. In FIG. 2, the upper column portion 26 is fully extended, again in a traditional presentation, but better suited for a full size adult in a conventional standing position. As indicated above, the upper column portion 26 can be extended to a plurality of different heights in between (not shown) and locked in position as needed. In FIGS. 3-5, the cantilever arm 56 is rotated back to the folded position with the platform 58 facing forwardly and the speed bag 12 presented for lower body work, such as kicking or knee strikes. In the illustrated configuration, the upper column portion 26 is retracted to its lower position. However, the upper column portion 26 could also be extended to any height as needed for the desired purpose. In FIG. 6, the cantilever arm 56 is in the folded position and the support column 22 is also in its folded position. In this configuration, the assembly 10 lays flat for easy storage and/or transportation, but is also usable for a variety of different striking exercises using the hands, elbows, feet and knees.

Turning back to FIG. 2, the support 10 may also be used for supporting a double ended bag 68. As illustrated, it is possible to disconnect the bottom end of one of the angled support arms 36 and rotate it forwardly where it can be used as a bottom anchor point for a double ended bag 68. The top end anchor uses an optional support rod 70 extending from the front side of the support column 22 for the upper anchor point.

To facilitate movement of the adjustable support 10 of the present invention, wheels 72 can be provided. In the exemplary embodiment, the wheels 72 may be secured to one side of the base 14 (shown on the front side) for selectively engaging a floor when a user wishes to move the adjustable support 10. When the user tilts the support 10 to a predetermined angle, the wheels 72 engage the floor, and facilitate movement of the adjustable support 10 with respect to the floor.

It can therefore be seen that the present invention provides an adjustable support 10 for a speed bag 12 that provides a way for all consumers, including those with physical limitations, to effectively train with a speed bag 12 in a variety of orientations; provides an adjustable support 10 that is portable, lightweight, and virtually effortless to use; provides an adjustable support 10 that can be easily adjusted for both vertical and horizontal orietnations; provides an adjustable support 10 that can be easily adjusted for users having a height in the range of 4 feet to 7 feet; provides an adjustable support 10 that is useful for helping wheelchair-bound individuals build speed and hand-eye coordination, while getting a good upper body workout; provides an adjustable support 10 that eliminates wall damage caused by being impacted by the speed bag 12 or caused by hardware used for mounting a speed bag to a wall; and provides an adjustable support 10 that can be easily stored and removed from sight when not in use. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An adjustable support for a speed bag comprising:
a base;
a telescoping support column comprising a lower column portion and an upper column portion,
the lower column portion being pivotably connected to the base, the telescoping support column being pivotably movable between a folded position wherein the telescoping support column is substantially parallel to the base, and a deployed upright position wherein the telescoping support column is substantially perpendicular to the base,
the upper column portion being slidably connected to the lower column portion, the upper and lower column portions configured to be telescoping;
an actuator mechanism for moving the upper column portion relative to the lower column portion between a retracted position and an extended position;
a telescoping locking mechanism configured to releasably lock the upper column portion in a plurality of telescoping positions relative to the lower column portion;
a cantilever arm having a first end pivotably connected to a top end of said upper column portion;
a speed bag platform secured adjacent a second end of the cantilever arm; the speed bag being mounted to the speed bag platform;
the cantilever arm being movable between a first folded position wherein the cantilever arm and speed bag platform are substantially parallel to the telescoping support column and a second cantilever position wherein the cantilever arm and speed bag platform are configured to extend substantially perpendicular to the telescoping support column; and
a platform locking mechanism configured and arranged to releasably secure said cantilever arm in at least said second cantilever position,
whereby the telescoping lower and upper column portions and the pivoting cantilever arm and speed bag platform allow the speed bag to be deployed and used at a plurality of heights and orientations.

2. The adjustable support of claim 1 further comprising one or plural angled supports releasably connected between the base and the lower column portion.

3. The adjustable support of claim 2, wherein the one or plural angled supports comprise two angled supports that respectively engage opposite sides of the base and lower column portion.

4. The adjustable support of claim 1, wherein the actuator mechanism comprises a rack and pinion mechanism.

5. The adjustable support of claim 1, wherein the lower column portion is pivotably connected to the base adjacent a front side thereof, and the lower column portion is pivotable rearwardly to the folded position.

6. The adjustable support of claim 1 further comprising wheels mounted to the base to facilitate movement of the adjustable support.

7. An adjustable support for a speed bag comprising:
a base;
a telescoping support column comprising a lower column portion and an upper column portion,
the lower column portion being pivotably connected to the base, the telescoping support column being pivotably movable between a folded position wherein the telescoping support column is substantially parallel to the base, and a deployed upright position wherein the telescoping support column is substantially perpendicular to the base,
the upper column portion being slidably connected to the lower column portion, the upper and lower column portions configured to be telescoping;
an actuator mechanism for moving the upper column portion relative to the lower column portion between a retracted position and an extended position;
a cantilever arm having a first end pivotably connected to a top end of said upper column portion; and a speed bag platform secured adjacent a second end of the cantilever arm; the speed bag being mounted to the speed bag platform;

the cantilever arm being movable between a first folded position wherein the cantilever arm and speed bag platform are substantially parallel to the telescoping support column and a second cantilever position wherein the cantilever arm and speed bag platform are configured to extend substantially perpendicular to the telescoping support column, whereby the telescoping lower and upper column portions and the pivoting cantilever arm and speed bag platform allow the speed bag to be deployed and used at a plurality of heights and orientations.

8. The adjustable support of claim 7 further comprising one or plural angled supports releasably connected between the base and the lower column portion.

9. The adjustable support of claim 8, wherein the one or plural angled supports comprise two angled supports that respectively engage opposite sides of the base and lower column portion.

10. The adjustable support of claim 7, wherein the actuator mechanism comprises a rack and pinion mechanism.

11. The adjustable support of claim 7, wherein the lower column portion is pivotably connected to the base adjacent a front side thereof, and the lower column portion is pivotable rearwardly to the folded position.

12. The adjustable support of claim 7 further comprising wheels mounted to the base to facilitate movement of the adjustable support.

13. The adjustable support of claim 7 further comprising a telescoping locking mechanism configured to releasably lock the upper column portion in a plurality of telescoping positions relative to the lower column portion.

14. The adjustable support of claim 13 further comprising a platform locking mechanism configured to releasably secure said cantilever arm in at least said second cantilever position.

15. The adjustable support of claim 7 further comprising a platform locking mechanism configured to releasably secure said cantilever arm in at least said second cantilever position.

* * * * *